(12) United States Patent
Peng et al.

(10) Patent No.: US 11,440,425 B2
(45) Date of Patent: Sep. 13, 2022

(54) CHARGING DEVICE AND METHOD FOR ALIGNING CHARGING DEVICE WITH VEHICLE FOR CHARGING

(71) Applicant: TRIPLE WIN TECHNOLOGY(SHENZHEN) CO.LTD., Shenzhen (CN)

(72) Inventors: Szu-Chi Peng, New Taipei (TW); Liang-Kao Chang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 120 days.

(21) Appl. No.: 17/023,712

(22) Filed: Sep. 17, 2020

(65) Prior Publication Data

US 2021/0339643 A1    Nov. 4, 2021

(30) Foreign Application Priority Data

Apr. 29, 2020 (CN) .......................... 202010355287.5

(51) Int. Cl.
| | |
|---|---|
| *B60L 53/37* | (2019.01) |
| *B60L 53/38* | (2019.01) |
| *B60L 53/66* | (2019.01) |
| *B60L 53/126* | (2019.01) |
| *H02J 50/90* | (2016.01) |
| *H02J 50/10* | (2016.01) |
| *H02J 7/02* | (2016.01) |
| *H02J 7/00* | (2006.01) |
| *G06T 7/70* | (2017.01) |

(Continued)

(52) U.S. Cl.
CPC ............. *B60L 53/37* (2019.02); *B60L 53/126* (2019.02); *B60L 53/38* (2019.02); *B60L 53/66* (2019.02); *G06T 7/70* (2017.01); *G06V 10/10* (2022.01); *G06V 20/00* (2022.01); *H02J 7/00032* (2020.01); *H02J 7/0049* (2020.01); *H02J 7/02* (2013.01); *H02J 50/10* (2016.02); *H02J 50/90* (2016.02); *G06T 2207/30248* (2013.01); *G06V 2201/08* (2022.01); *H02J 2310/48* (2020.01)

(58) Field of Classification Search
CPC ........................................................ B60L 53/37
USPC ........................................................ 320/108
See application file for complete search history.

(56) References Cited

U.S. PATENT DOCUMENTS

| | | | |
|---|---|---|---|
| 7,999,506 B1 * | 8/2011 | Hollar ..................... | B60L 53/34 |
| | | | 320/109 |
| 8,169,186 B1 * | 5/2012 | Haddad ................... | B60L 53/65 |
| | | | 180/205.1 |

(Continued)

FOREIGN PATENT DOCUMENTS

| CN | 105691218 A | 6/2016 |
|---|---|---|
| CN | 110816355 A | 2/2020 |

*Primary Examiner* — Jerry D Robbins
(74) *Attorney, Agent, or Firm* — ScienBiziP, P.C.

(57) ABSTRACT

A method for aligning a charging device with a vehicle for charging includes detecting whether a vehicle is parked on a parking space where the charging device is located. If so, capturing at least one image of the vehicle and determining a position of a power receiving device of the vehicle by reference to the at least one image. Controlling movement of the charging device based on the relative positions of the power receiving device and a position of the charging device and aligning the charging device to couple wirelessly and charging the vehicle.

14 Claims, 4 Drawing Sheets

(51) Int. Cl.
*G06V 10/10* (2022.01)
*G06V 20/00* (2022.01)

(56) References Cited

U.S. PATENT DOCUMENTS

| | | | |
|---|---|---|---|
| 2014/0111155 A1* | 4/2014 | Bendicks | H02J 50/90 |
| | | | 320/108 |
| 2015/0061576 A1* | 3/2015 | Chen | B60L 53/37 |
| | | | 320/108 |
| 2017/0001527 A1* | 1/2017 | Prokhorov | B60L 53/65 |
| 2018/0056801 A1* | 3/2018 | Leary | B60L 53/305 |
| 2019/0280503 A1* | 9/2019 | Hsieh | G06K 19/06037 |
| 2020/0139843 A1* | 5/2020 | Park | B60L 53/36 |
| 2021/0061116 A1* | 3/2021 | Lin | B60L 53/37 |
| 2021/0094431 A1* | 4/2021 | Yang | B60L 53/37 |

* cited by examiner

CHARGING DEVICE AND METHOD FOR ALIGNING CHARGING DEVICE WITH VEHICLE FOR CHARGING

CROSS-REFERENCE TO RELATED APPLICATIONS

This application claims priority to Chinese Patent Application No. 202010355287.5 filed on Apr. 29, 2020, the contents of which are incorporated by reference herein.

FIELD

The subject matter herein generally relates to electric vehicles, and particularly to a charging device and a method for aligning a charging device with a vehicle for charging.

BACKGROUND

Electric vehicles, such as electric cars, electric motorcycles, and electric bicycles, need to be recharged if they use a battery. Electric vehicles are usually charged by plug-in wired charging method, the method requires users to manually connect when charging, hidden hazards may compromise safety.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Figure 1:
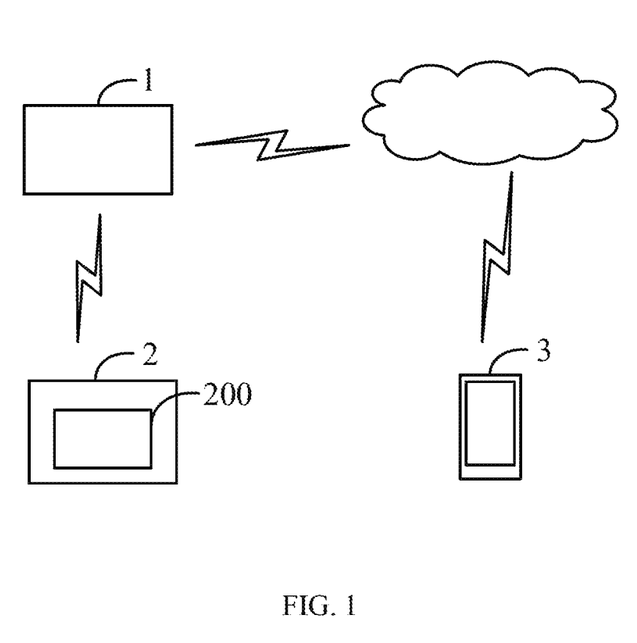
FIG. 1 is a schematic view of an embodiment of an application environment of a charging device.

Referring to FIG. 1, a charging device 1 which can couple with a vehicle 2 and charge the vehicle 2 is illustrated. In at least one embodiment, the vehicle 2 can be an electric vehicle, such as an electric car. The charging device 1 can be arranged on a parking space, and when the vehicle 2 is parked on the parking space, the charging device 1 can wirelessly charge the vehicle 2.

The charging device 1 can further communicate with a terminal device 3 through a wireless network. In at least one embodiment, the wireless network can be radio, WI-FI, or cellular network.

Figure 2:
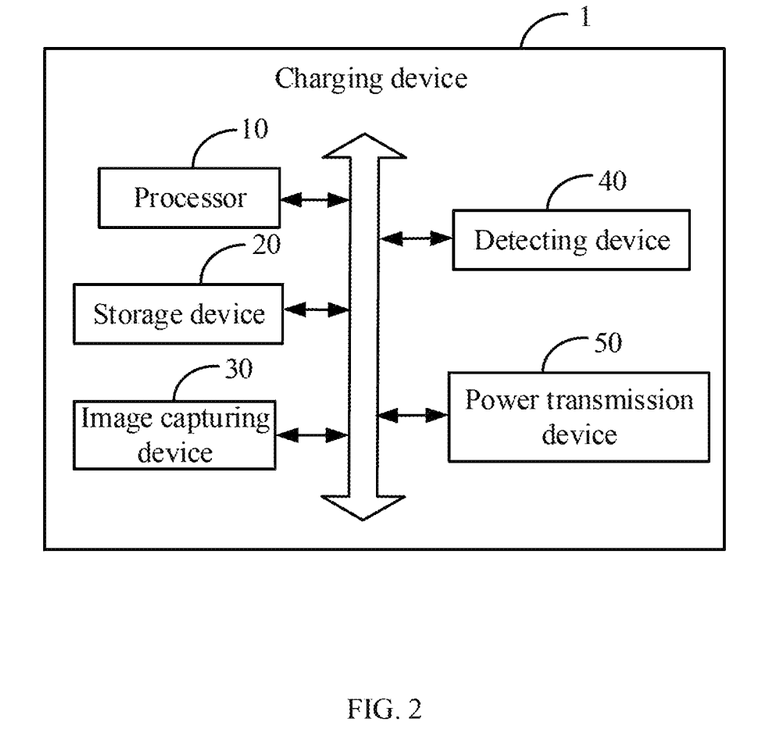
FIG. 2 is a block diagram of an embodiment of a charging device.

FIG. 2 illustrates the charging device 1 in one embodiment. The charging device 1 includes, but is not limited to, a processor 10, a storage device 20, an image capturing device 30, a detecting device 40, and a power transmission device 50. FIG. 2 illustrates only one example of the charging device 1. Other examples can include more or fewer components than as illustrated or have a different configuration of the various components in other embodiments.

The processor 10 can be a central processing unit (CPU), a microprocessor, or other data processor chip that performs functions in the charging device 1.

In at least one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

In at least one embodiment, the image capturing device 30 can be a camera. The image capturing device 30 captures images of the scene around the charging device 1.

In at least one embodiment, the detecting device 40 can be an infrared sensor. The detecting device 40 detects whether the vehicle 2 is parked on the parking space.

In at least one embodiment, the power transmission device 50 can be a wireless charging board. The vehicle 2 at least includes a power receiving device 200. The power transmission device 50 defines a number of charging coils, which transmit power from the charging device 1 to the power receiving device 200. In at least one embodiment, the power receiving device 200 can be a wireless receiving board arranged on a bottom of the vehicle 2. The power receiving device 200 receives the power transmitted by the power transmission device 50.

Figure 3:
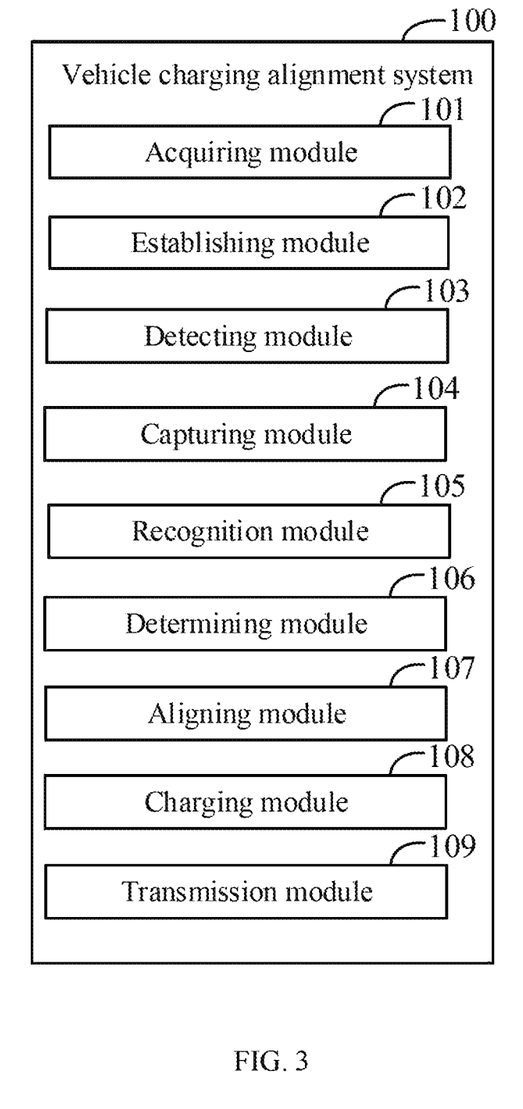
FIG. 3 is a block diagram of an embodiment of a vehicle charging alignment system.

As illustrated in FIG. 3, the charging device 1 runs a vehicle charging alignment system 100. The vehicle charging alignment system 100 at least includes an acquiring module 101, an establishing module 102, a detecting module 103, a capturing module 104, a recognition module 105, a determining module 106, an aligning module 107, a charging module 108, and a transmission module 109. The modules 101-109 can be collections of software instructions stored in the storage device 20 of the charging device 1 and executed by the processor 10. The modules 101-109 also can include functionality represented as hardware or integrated circuits, or as software and hardware combinations, such as a special-purpose processor or a general-purpose processor with special-purpose firmware.

The acquiring module 101 is used to acquire information as to body structure of a number of types of vehicles 2 and information as to the position of the power receiving device 200 on each type of vehicle 2.

In at least one embodiment, the acquiring module 101 acquires the information as to body structure of the number of types of vehicles 2 and the information as to the position of the power receiving device 200 through big data search or web crawler. Vehicles of the same type have the same information as to body structure and information as to the position of the power receiving device 200. Vehicles of the same type may be vehicles of the same brand or model.

In at least one embodiment, the information as to body structure includes contours of the vehicle and/or distribution of various components. The various components can include battery boxes, tires, and engine. The information as to the position of the power receiving device 200 includes coordinate information relative to the vehicle 2 and/or relative positions with components such as doors, tires, and rearview mirrors. The coordinate information relative to the vehicle 2 can be coordinate information of a coordinate system based on the vehicle 2.

The establishing module 102 is used to establish a charging position recognition model based on the information as to body structure of the number of types of vehicles 2 and the information as to the position of the power receiving device 200.

In at least one embodiment, the charging position recognition model includes a relationship between the vehicle types, the information as to body structure, and the information as to the position of the power receiving device 200.

For example, the vehicle type in the charging position recognition model is Tesla Model S. The information as to body structure includes at least one image of vehicle body contour of Tesla Model S, and the information as to the position of the power receiving device 200 includes coordinate information of a charging port or a charging board of Tesla Model S relative to the vehicle body.

The detecting module 103 is used to detect whether the vehicle 2 is parked in the parking space where the charging device 1 is located.

In at least one embodiment, the detecting module 103 controls the detecting device 40 to detect whether the vehicle 2 is parked in the parking space where the charging device 1 is located.

In detail, if the detecting device 40 detects that an object is directly approaching the charging device 1, the detecting module 103 determines that the vehicle 2 is parked on the parking space. If the detecting device 40 does not detect that any object approaches the charging device 1, the detecting module 103 determines that the vehicle 2 is not parked on the parking space.

In other embodiments, if the detecting device 40 detects that an object is approaching the charging device 1, and the object when stationary does not move away from the charging device 1 for a predetermined time, the detecting module 103 determines that the vehicle 2 is parked on the parking space. If the detecting device 40 does not detect any object approaching the charging device 1, or if the detecting device 40 detects an object approaching the charging device 1, but the object moves away from the charging device 1 within the predetermined time, the detecting module 103 determines that the vehicle 2 is not parked in the parking space. The predetermined time can be one minute.

If the detecting module detects that the vehicle 2 is parked on the parking space, the capturing module 104 is used to capture at least one image of the vehicle 2.

In at least one embodiment, the charging device 1 includes an image capturing device 30. The image capturing device 30 is arranged at a center position of the parking space. The capturing module 104 controls the image capturing device 30 to capture an image of the underside of the vehicle 2.

In another embodiment, the image capturing device 30 can be arranged at a boundary of the parking space. The capturing module 104 controls the image capturing device 30 to capture an image of a side of the vehicle 2.

In another embodiment, the charging device 1 can include three image capturing devices 30. Two of the image capturing devices 30 are arranged at the boundary or boundaries of the parking space, and one of the image capturing devices 30 is arranged at the center position of the parking place. The capturing module 104 controls the image capturing devices 30 to capture two images of sides and one image of the underside of the vehicle 2.

In detail, if the detecting module 103 detects that the vehicle 2 is parked on the parking space, the capturing module 104 can determine whether the charging device 1 receives a charging instruction from the terminal device 3 of the user. If the charging device 1 receives the charging instruction from the terminal device 3 of the user, the capturing module 104 captures the image of the vehicle 2. That is, when the vehicle 2 is parked on the parking space, the user can determine and command that the vehicle 2 be charged according to a current state of charge of the vehicle 2, and terminal device 3 can transmit the charging instruction to the charging device 1, when the vehicle 2 needs to be charged.

In other embodiments, when the vehicle 2 is parked on the parking space, the terminal device 3 can send the current state of charge to the charging device 1. The capturing module 104 determines whether the current state of charge of the vehicle 2 is less than a predetermined percentage. If the current state of charge of the vehicle 2 less than the predetermined percentage, the capturing module 104 captures images of the vehicle 2. The predetermined percentage can be 60% of a full charge.

The recognition module 105 is used to determine a position of the power receiving device 200 of the vehicle 2 by recognizing the images captured by the capturing module 104.

In at least one embodiment, the recognition module 105 determines the position of the power receiving device 200 of the vehicle 2 according to the images and the charging position recognition model.

In detail, the recognition module 105 processes the images to acquire the contours of the vehicle 2 in the images, the contours of vehicle 2 can be the information as to body structure. The recognition module 105 further determines the position of the power receiving device 200 according to the information as to body structure and the relationship between the information as to body structure and the information as to the position of the power receiving device 200. In at least one embodiment, the position of the power receiving device 200 can be coordinate information of the power receiving device 200 relative to the body of the vehicle 2.

The determining module 106 is used to determine movement parameters of the charging device 1 based on the position of the power receiving device 200 and a position of the charging device 1.

In at least one embodiment, the power transmission device 50 is movable. The power transmission device 50 can move and align with the power receiving device 200 according to the movement parameters. The image capturing device 30 can define an internal parameter matrix K, a rotation matrix R, and a translation vector t.

In detail, the determining module 106 determines a pixel coordinate of the vehicle 2 in the image based on pixels of captured images and the information as to body structure (the contours of the vehicle 2). In at least one embodiment, the pixel coordinate of the pixels can be based on a center point of the contours of the vehicle 2.

The determining module 106 further converts the pixel coordinate of the vehicle 2 to a camera coordinate according to the internal parameter matrix K of the image capturing device 30. The pixel coordinate of the center point is assumed to be $$\begin{bmatrix} u \\ v \\ 1 \end{bmatrix}.$$

The determining module 106 converts the pixel coordinate of the vehicle 2 to the camera coordinate according to formula (formula 01):

$$\begin{bmatrix} x_c \\ y_c \\ z_c \end{bmatrix} = K^{-1} \begin{bmatrix} u \\ v \\ 1 \end{bmatrix} z_c.$$

The determining module 106 further converts the camera coordinate of the vehicle 2 to a world coordinate $$\begin{bmatrix} X \\ Y \\ Z \end{bmatrix}$$

according to the rotation matrix R and the translation vector t of the image capturing device 30. The determining module 106 converts the camera coordinate of the vehicle 2 to the world coordinate according to formula (formula 02):

$$\begin{bmatrix} X \\ Y \\ Z \end{bmatrix} = R^{-1} \left( \begin{bmatrix} x_c \\ y_c \\ z_c \end{bmatrix} - t \right).$$

The determining module 106 further determines a world coordinate of the power receiving device 200 according to the world coordinate of the vehicle 2 and the information as to position of the power receiving device 200. In at least one embodiment, the world coordinate of the power receiving device 200 can be the world coordinate of a center point of the power receiving device 200.

In at least one embodiment, the storage device 20 stores an initial world coordinate of the power transmission device 50 when charging device 1 is located at an initial resting position. The determining module 106 further determines the movement parameter, according to the deviation between the initial world coordinate of the power transmission device 50 and the world coordinate of the power receiving device 200.

The aligning module 107 is used to control the charging device 1 to move until aligned with the power receiving device 200 according to the movement parameter.

In at least one embodiment, the aligning module 107 controls the power transmission device 50 to move to a position where the world coordinate of the power transmission device 50 is identical with the world coordinate of the power receiving device 200, or where the XY axis coordinate of the world coordinate of the power transmission device 50 is identical with the XY axis coordinate of the world coordinate of the power receiving device 200, according to the movement parameter. The aligning module 107 can determine that the power transmission device 50 is aligned with the power receiving device 200 and control the charging device 1 to stop moving.

The charging module 108 is used to control the charging device 1 to couple with the power receiving device 200 and to charge the vehicle 2.

In at least one embodiment, the charging module 108 controls the charging device 1 to make an electrical connection with the power receiving device 200 without actual contact, and can wirelessly charge the vehicle 2.

The transmission module 109 is used to transmit prompt information to the terminal device 3 of the user when the charging device 1 completes the charging of the vehicle 2.

In at least one embodiment, the prompt information can be a short message.

When the charging device 1 completes charging the vehicle 2, the charging module 108 further controls the charging device 1 to disconnect the electrical connection with the power receiving device 200.

Figure 4:
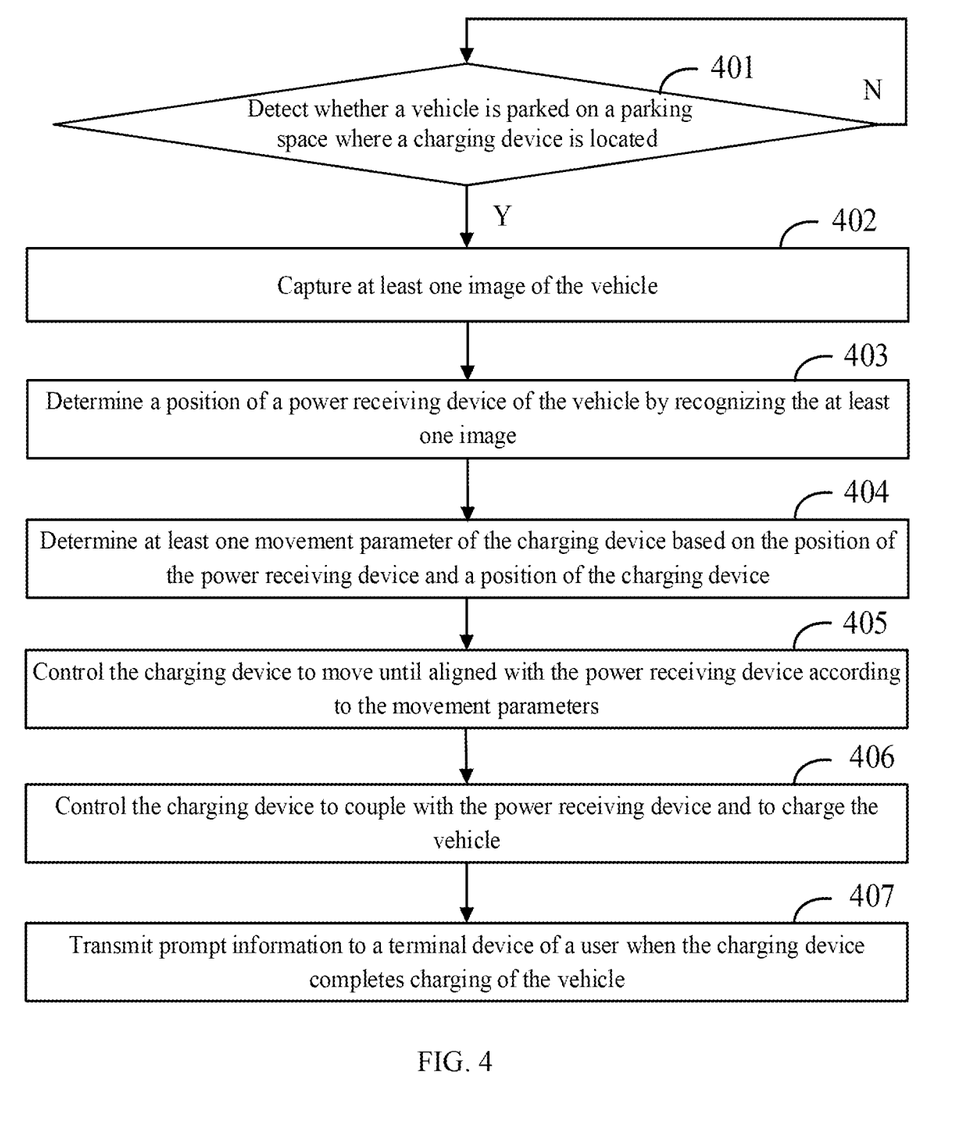
FIG. 4 illustrates a flowchart of an embodiment of a method for aligning a charging device with a vehicle for charging.

FIG. 4 illustrates a flowchart of an embodiment of a method for aligning a charging device with a vehicle for charging. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the detecting module 103 detects whether the vehicle 2 is parked in the parking space where the charging device 1 is located. If the detecting module 103 detects that the vehicle 2 is parked in the parking space, the process goes to block 402. If the detecting module 103 does not detect that the vehicle 2 is parked in the parking space, the process continues to block 401.

At block 402, the capturing module 104 captures at least one image of the vehicle 2.

At block 403, the recognition module 105 determines a position of the power receiving device 200 of the vehicle 2 by recognizing the at least one image.

At block 404, the determining module 106 determines movement parameters of the charging device 1 based on the position of the power receiving device 200 and a position of the charging device 1.

At block 405, the aligning module 107 controls the charging device 1 to move until aligned with the power receiving device 200 according to the movement parameter.

At block 406, the charging module 108 controls the charging device 1 to couple with the power receiving device 200 and to charge the vehicle 2.

At block 407, the transmission module 109 transmits prompt information to the terminal device 3 of the user when the charging device 1 completes the charging of the vehicle 2.

In at least one embodiment, the method further comprises: the acquiring module 101 acquires information as to body structure of a number of types of vehicles 2 and information as to the position of the power receiving device 200 on each type of vehicle 2; the establishing module 102 establishes a charging position recognition model based on the information as to body structure of the number of types of vehicles 2 and the information as to the position of the power receiving device 200.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A charging device comprising:
   at least one processor; and
   a storage device coupled to the at least one processor and storing instructions for execution by the at least one processor to cause the at least one processor to:
   detect whether a vehicle is parked on a parking space where a charging device is located;
   capture, in response that the vehicle is detected to be parked on the parking space where the charging device is located, at least one image of the vehicle;
   determine a position of a power receiving device of the vehicle by recognizing the at least one image;
   determine a pixel coordinate of the vehicle in the image according to information as to body structure of the vehicle;
   convert the pixel coordinate of the vehicle to a camera coordinate;
   convert the camera coordinate of the vehicle to a world coordinate;
   determine a world coordinate of the power receiving device according to the world coordinate of the vehicle and information as to position of the power receiving device; and
   determine at least one movement parameter of the charging device according to deviation between an initial world coordinate of a power transmission device of the charging device and the world coordinate of the power receiving device;
   control the charging device to move until aligned with the power receiving device according to the at least one movement parameter; and
   control the charging device to couple with the power receiving device and to charge the vehicle.

2. The charging device according to claim 1, wherein the at least one processor is further caused to:
   acquire information as to body structure of a plurality of types of vehicles and the information as to position of the power receiving device on each type of vehicle; and
   establish a charging position recognition model based on the information as to body structure of the plurality of types of vehicles and the information as to position of the power receiving device.

3. The charging device according to claim 2, wherein the at least one processor is further caused to:
   determine the position of the power receiving device of the vehicle according to the at least one image and the charging position recognition model.

4. The charging device according to claim 3, wherein the at least one processor is further caused to:
   process the at least one image to acquire the information as to body structure; and
   determine the position of the power receiving device according to the information as to body structure and the charging position recognition model.

5. The charging device according to claim 1, wherein the at least one processor is further caused to:
   determine, in response that the vehicle is detected to be parked on the parking space, whether the charging device receives a charging instruction from a terminal device of a user; and
   capture, in response that the charging device receives the charging instruction from the terminal device of the user, the at least one image of the vehicle.

6. The charging device according to claim 1, wherein the at least one processor is further caused to:
   transmit prompt information to a terminal device of a user when the charging device completes charging of the vehicle.

7. The charging device according to claim 1, wherein the at least one processor is further caused to:
   control the charging device to make an electrical connection with the power receiving device without actual contact, and wirelessly charge the vehicle.

8. A method for aligning a charging device with a vehicle for charging implemented in a charging device comprising:
   detecting whether a vehicle is parked on a parking space where a charging device is located;
   capturing, in response that the vehicle is detected to be parked on the parking space where the charging device is located, at least one image of the vehicle;
   determining a position of a power receiving device of the vehicle by recognizing the at least one image;
   determining at least one movement parameter of the charging device based on the position of the power receiving device and a position of the charging device, comprising:
   determining a pixel coordinate of the vehicle in the image according to information as to body structure of the vehicle;
   converting the pixel coordinate of the vehicle to a camera coordinate;
   converting the camera coordinate of the vehicle to a world coordinate;
   determining a world coordinate of the power receiving device according to the world coordinate of the vehicle and information as to position of the power receiving device; and determining the at least one movement parameter of the charging device according to deviation between an initial world coordinate of a power transmission device of the charging device and the world coordinate of the power receiving device;

controlling the charging device to move until aligned with the power receiving device according to the at least one movement parameter; and controlling the charging device to couple with the power receiving device and to charge the vehicle.

9. The method according to claim 8, further comprising:

acquiring information as to body structure of a plurality of types of vehicles and the information as to position of the power receiving device on each type of vehicle; and establishing a charging position recognition model based on the information as to body structure of the plurality of types of vehicles and the information as to position of the power receiving device.

10. The method according to claim 9, wherein a method of determining a position of a power receiving device of the vehicle by recognizing the at least one image comprises:

determining the position of the power receiving device of the vehicle according to the at least one image and the charging position recognition model.

11. The method according to claim 10, wherein the step of determining the position of the power receiving device of the vehicle according to the at least one image and the charging position recognition mode comprises:

processing the at least one image to acquire the information as to body structure; and determining the position of the power receiving device according to the information as to body structure and the charging position recognition model.

12. The method according to claim 8, wherein the step of capturing at least one image of the vehicle comprises:

determining, in response that the vehicle is detected to be parked on the parking space, whether the charging device receives a charging instruction from a terminal device of a user; and capturing, in response that the charging device receives the charging instruction from the terminal device of the user, the at least one image of the vehicle.

13. The method according to claim 8, further comprising:

transmitting prompt information to a terminal device of a user when the charging device completes charging of the vehicle.

14. The method according to claim 8, wherein the step of controlling the charging device to couple with the power receiving device and to charge the vehicle comprises:

controlling the charging device to make an electrical connection with the power receiving device with actual contact, and wirelessly charge the vehicle.

* * * * *